(12) United States Patent
Noponen

(10) Patent No.: US 12,015,182 B2
(45) Date of Patent: Jun. 18, 2024

(54) ASSEMBLY METHOD AND ARRANGEMENT FOR A CELL SYSTEM

(71) Applicant: Elcogen Oy, Vantaa (FI)

(72) Inventor: Matti Noponen, Espoo (FI)

(73) Assignee: ELCOGEN OY, Vantaa (FI)

( * ) Notice: Subject to any disclaimer, the term of this patent is extended or adjusted under 35 U.S.C. 154(b) by 0 days.

(21) Appl. No.: 15/228,581

(22) Filed: Aug. 4, 2016

(65) Prior Publication Data

US 2016/0344057 A1 Nov. 24, 2016

Related U.S. Application Data

(63) Continuation of application No. PCT/FI2014/050086, filed on Feb. 5, 2014.

(51) Int. Cl.
*H01M 8/249* (2016.01)
*C25B 9/01* (2021.01)
(Continued)

(52) U.S. Cl.
CPC .............. *H01M 8/247* (2013.01); *C25B 9/01* (2021.01); *C25B 9/70* (2021.01); *C25B 15/08* (2013.01);
(Continued)

(58) Field of Classification Search
CPC .... H01M 8/248; H01M 8/2485; H01M 8/249; H01M 2008/1293
See application file for complete search history.

(56) References Cited

U.S. PATENT DOCUMENTS 5,298,341 A    3/1994  Khandkar et al.
9,478,812 B1 * 10/2016  Darga ................. H01M 8/0247
(Continued)

FOREIGN PATENT DOCUMENTS

EP    0 585 049 A1    3/1994
EP    2 600 456 A1    6/2013
(Continued)

OTHER PUBLICATIONS

Office Action (Notice of Reason(s) for Rejection) dated Jan. 31, 2017, by the Japanese Patent Office in corresponding Japanese Patent Application No. 2016-549037 and an English Translation of the Office Action. (17 pages).

Office Action (Notification of Reason for Refusal) dated Mar. 13, 2017, by the Korean Intellectual Property Office in corresponding Korean Patent Application No. 10-2016-7024340 and an English Translation of the Office Action. (11 pages).

(Continued)

*Primary Examiner* — Barbara L Gilliam
*Assistant Examiner* — Helen M McDermott
(74) *Attorney, Agent, or Firm* — BUCHANAN INGERSOLL & ROONEY PC

(57) ABSTRACT

An assembly arrangement of solid oxide cells in a fuel cell system or in an electrolyzer cell system is disclosed which includes cells arranged at least to four angles and at least one cell stack formation. At least one substantially plain attachment side of each at least four angled stack formation includes at least one geometrically deviating attachment surface structure in the otherwise substantially plain side between at least two corners of the at least four angled stack formation. At least one flow restriction structure restricts air flows in the cell system to be mounted against the geometrically deviating attachment surface structure of each stack formation to attach at least one cell stack formation in the assembly arrangement. An electrical insulation is arranged to the attachment of the flow restriction structure and the stack formation.

11 Claims, 8 Drawing Sheets

(51) Int. Cl.

| | | |
|---|---|---|
| *C25B 9/70* | (2021.01) | |
| *C25B 15/08* | (2006.01) | |
| *H01M 8/00* | (2016.01) | |
| *H01M 8/0258* | (2016.01) | |
| *H01M 8/04082* | (2016.01) | |
| *H01M 8/04089* | (2016.01) | |
| *H01M 8/12* | (2016.01) | |
| *H01M 8/1231* | (2016.01) | |
| *H01M 8/2425* | (2016.01) | |
| *H01M 8/2432* | (2016.01) | |
| *H01M 8/2457* | (2016.01) | |
| *H01M 8/247* | (2016.01) | |
| *H01M 8/248* | (2016.01) | |
| *H01M 8/2484* | (2016.01) | |
| *H01M 8/2485* | (2016.01) | |

(52) U.S. Cl.
CPC ......... *H01M 8/002* (2013.01); *H01M 8/0258* (2013.01); *H01M 8/04089* (2013.01); *H01M 8/04201* (2013.01); *H01M 8/1231* (2016.02); *H01M 8/2425* (2013.01); *H01M 8/2432* (2016.02); *H01M 8/2457* (2016.02); *H01M 8/248* (2013.01); *H01M 8/2484* (2016.02); *H01M 8/2485* (2013.01); *H01M 8/249* (2013.01); *H01M 2008/1293* (2013.01); *Y02E 60/36* (2013.01); *Y02E 60/50* (2013.01)

(56) References Cited

U.S. PATENT DOCUMENTS

| | | | |
|---|---|---|---|
| 2002/0127453 A1* | 9/2002 | Kitagawa | H01M 8/248 |
| | | | 429/457 |
| 2006/0292430 A1* | 12/2006 | Lessing | H01M 8/243 |
| | | | 429/432 |
| 2007/0196704 A1* | 8/2007 | Valensa | H01M 8/04022 |
| | | | 429/423 |
| 2010/0190090 A1* | 7/2010 | Kuno | H01M 8/2425 |
| | | | 429/495 |
| 2010/0209800 A1* | 8/2010 | Yamanis | H01M 8/0247 |
| | | | 429/457 |
| 2012/0295180 A1 | 11/2012 | Homma | |
| 2013/0122387 A1 | 5/2013 | Ono | |
| 2013/0130145 A1 | 5/2013 | Kaeding et al. | |
| 2014/0134515 A1 | 5/2014 | Shinohara et al. | |

FOREIGN PATENT DOCUMENTS

| | | |
|---|---|---|
| JP | 2009-245627 A | 10/2009 |
| JP | 2010-516038 A | 5/2010 |
| JP | 2010-199059 A | 9/2010 |
| JP | 2010-257780 A | 11/2010 |
| JP | 2011-192552 A | 9/2011 |
| JP | 2011-198704 A | 10/2011 |
| JP | 2013-20887 A | 1/2013 |

OTHER PUBLICATIONS

Office Action dated Aug. 25, 2017, by the Korean Patent Office in corresponding Korean Patent Application No. 10-2016-7024340. (3 pages).

International Search Report (PCT/ISA/210) dated Oct. 7, 2014, by the European Patent Office as the International Searching Authority for International Application No. PCT/FI2014/050086.

Written Opinion (PCT/ISA/237) dated Oct. 7, 2014, by the European Patent Office as the International Searching Authority for International Application No. PCT/FI2014/050086.

International Preliminary Report on Patentability (PCT/IPEA/409) dated Jan. 8, 2016, by the European Patent Office as the International Searching Authority for International Application No. PCT/FI2014/050086.

\* cited by examiner

ASSEMBLY METHOD AND ARRANGEMENT FOR A CELL SYSTEM

RELATED APPLICATION

This application claims priority as a continuation application under 35 U.S.C. § 120 to PCT/FI2014/050086 filed as an International Application on 5 Feb. 2014 designating the U.S., the entire content of which is hereby incorporated by reference in its entirety.

FIELD

The present invention relates to arranging input reactant distribution in a Solid Oxide Fuel Cell (SOFC) stack or in a Solid Oxide Electrolyzer Cell (SOEC) stack. A fuel cell causes input reactant fuel gas on an anode electrode and gaseous oxidizer (oxygen) on a cathode electrode to react in order to produce electricity. Electrolyzer reactions are reverse to fuel cell, i.e. electricity is used to produce fuel and oxygen. SOFC and SOEC stacks include stacked cell elements and separators, i.e. flow field plates, in a sandwiched manner wherein each cell element is constituted by sandwiching an electrolyte, the anode side and the cathode side. The reactants are guided by flow field plates to the porous electrodes.

BACKGROUND INFORMATION

Most of the energy of the world is produced by oil, coal, natural gas or nuclear power. All these production methods have their specific issues as far as, for example, availability and friendliness to environment are concerned. As far as the environment is concerned, especially oil and coal cause pollution when they are combusted. An issue with nuclear power is, at least, storage of used fuel.

Especially because of the environmental issues, new energy sources, more environmentally friendly and, for example, having a better efficiency than the above-mentioned energy sources, have been developed. Fuel cells, by which energy of fuel, for example biogas, is directly converted to electricity via a chemical reaction in an environmentally friendly process, and electrolyzers, in which electricity is converted to a fuel, are promising future energy conversion devices.

Renewable energy production methods such as photovoltaic and wind power face issues in seasonal production variations as their electricity production is limited by environmental effects. In the case of over production, hydrogen production through water electrolysis is suggested to be one of the future energy storing options. Furthermore, an electrolyzer cell can also be utilized to produce high quality methane gas from renewably biogas stores.

A fuel cell, as presented in FIG. 1, includes an anode side 100 and a cathode side 102 and an electrolyte material 101 between them. In solid oxide fuel cells (SOFCs) oxygen 106 is fed to the cathode side 102 and it is reduced to a negative oxygen ion by receiving electrons from the cathode. The negative oxygen ion goes through the electrolyte material 101 to the anode side 100 where it reacts with fuel 108 producing electrons, water and also typically carbon dioxide ($CO_2$). Anode 100 and cathode 102 are connected through an external electric circuit 111 having a load 110 for the fuel cell withdrawing electrical energy alongside heat out of the system. The fuel cell reactions in the case of methane, carbon monoxide and hydrogen fuel are shown below:

Anode: $CH_4 + H_2O = CO + 3H_2$ $CO + H_2O = CO_2 + H_2$ $H_2 + O^{2-} = H_2O + 2e^-$ Cathode: $O_2 + 4e^- = 2O^{2-}$ Net reactions: $CH_4 + 2O_2 = CO_2 + 2H_2O$ $CO + \frac{1}{2}O_2 = CO_2$ $H_2 + \frac{1}{2}O_2 = H_2O$ In electrolysis operating mode (solid oxide electrolyzer cells (SOEC)) the reaction is reversed, i.e. heat, as well as electrical energy from a source 110, are supplied to the cell where water and often also carbon dioxide are reduced in the anode side forming oxygen ions, which move through the electrolyte material to the cathode side where oxidation reaction of oxygen ions takes place. It is possible to use the same solid electrolyte cell in both SOFC and SOEC modes. In such a case and in the context of this description the electrodes are typically named anode and cathode based on the fuel cell operating mode, whereas in purely SOEC applications the oxygen electrode may be named the anode, and the reactant electrode as the cathode.

Solid oxide electrolyzer cells operate at temperatures which allow high temperature electrolysis reaction to take place, the temperatures being, for example, between 500-1000° C., but even over 1000° C. temperatures may be useful. These operating temperatures are similar to those conditions of the SOFCs. The net cell reaction produces hydrogen and oxygen gases. The reactions for one mole of water are shown below, with reduction of water occurring at the anode:

Anode: $H_2O + 2e^- \rightarrow 2H_2 + O^{2-}$

Cathode: $O^{2-} \rightarrow \frac{1}{2}O_2 + 2e^-$

Net Reaction: $H_2O \rightarrow H_2 + \frac{1}{2}O_2$

In Solid Oxide Fuel Cell (SOFC) and Solid Oxide Electrolyzer (SOEC) stacks where the flow direction of the cathode gas relative to the anode gas internally in each cell as well as the flow directions of the gases between adjacent cells, are combined through different cell layers of the stack. Further, the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

A SOFC delivers in normal operation a voltage of approximately 0.8V. To increase the total voltage output, the fuel cells are usually assembled in stacks in which the fuel cells are electrically connected via flow field plates, i.e. interconnector plates, bipolar plates, separators. The desired level of voltage determines the number of cells needed.

Bipolar plates separate the anode and cathode sides of adjacent cell units and at the same time enable electron conduction between anode and cathode. Interconnectors, or bipolar plates are normally provided with a plurality of channels for the passage of fuel gas on one side of the interconnector plate and oxidant gas on the other side. The flow direction of the fuel gas is defined as the substantial direction from the fuel inlet portion to the fuel outlet portion of a cell unit. Likewise, the flow direction of the oxidant gas, the cathode gas, is defined as the substantial direction from the cathode inlet portion to the cathode outlet portion of a cell unit.

The cells can be stacked one on top of each other with a complete overlap resulting in a stack with for instance co-flow having all fuel and oxidant inlets on one side of the stack and all fuel and oxidant outlets on the opposite side. One feature affecting the temperatures of the structure in operation is steam reformation of the fuel that is fed into the cell. Steam reformation is endothermic reaction and cools the fuel inlet edge of the cell.

Due to the exothermicity of the electrochemical process, the outlet gases leave at higher temperature than the inlet temperature. When endothermic and exothermic reactions are combined in an SOFC stack a significant temperature gradient across the stack is generated. Large thermal gradients induce thermal stresses in the stack which are highly undesirable and they entail difference in current density and electrical resistance. Therefore the issue of thermal management of an SOFC stack exists: to reduce thermal gradients enough to avoid unacceptable stresses and to maximize electric efficiency through homogenous current density profile.

Known prior art fuel cell or electrolyzer cell systems can experience thermal gradients due to uneven gas distribution over the electrolyte element. This causes lower duty ratio of the cell and thermal stresses due to uneven thermal and operational load also deteriorates the cell.

The single largest energy consumption device in a fuel cell system is the air blower or compressor that is used to supply air to the cathode compartment of fuel cell stack. The power consumption of the air supply devices is proportional to the pressure level they have to compress the air. Also in solid oxide electrolyzer system, air is typically supplied to the anode in order to control the heat balance of the electrolyzer stack and to sustain well defined oxygen partial pressure on the anode compartment. One of the main pressure loss sources in the fuel cell and electrolyzer system is the stack itself.

An issue associated to a stack design with air channels opened to the supply and exhaust compartments is that the main air flow has to be guided through the air channels and not to pass the stack from its edges. For example, the stack has to be compressed from its edges with a flow restriction arrangement. The compression has to be high enough to guarantee that no major gap can be created between the stack edge and the flow restriction structure. On the other hand compression has to be low enough in order that the stack can freely expand and shrink in all directions when its temperature is cycled from room temperature to its operating temperature that is for example between 500-1000° C. If the compression is too low, the air flow through the stack is not well known and may result e.g. in local over heating of the device. If the compression is too high, the stack structure cannot freely move with thermal expansion which may result in mechanical failure of the device.

SUMMARY

Assembly arrangement of solid oxide cells for a fuel cell system or for an electrolyzer cell system is disclosed, the assembly arrangement comprising: cells arranged within at least one cell stack formation which is at least a four angled cell stack formation; at least one plain attachment side of each four angled cell stack formation, said side having at least one geometrically deviating attachment surface structure in the otherwise plain attachment side between at least two corners of the at least four angled stack formation, the geometrically deviating attachment surface structure intruding into or extruding from the at least one plain attachment side to compensate mechanical stresses due to thermal expansions of materials; at least one flow restriction structure configured for restricting air flows in a cell system to be mounted against the geometrically deviating attachment surface structure of each stack formation to attach at least one additional cell stack formation to the at least one cell stack formation in the assembly arrangement; and an electrical insulation arranged relative to the flow restriction structure and the at least one cell stack formation.

A method is also disclosed for assembling solid oxide cells for a fuel cell system or for an electrolyzer cell system, comprising: arranging cells to at least one cell stack formation having at least a four angled cell stack formation; providing a geometrically deviating attachment surface structure which is intruding into or extruding from at least one plain attachment side to compensate mechanical stresses due to thermal expansions of materials; restricting air flows in the cell system by a flow restriction structure, which is mounted against the geometrically deviating attachment surface structure in the plain attachment side of each stack formation and which is configured to attach at least additional one cell stack formation in the assembly arrangement; and electrically insulating the attachment of the flow restriction structure and the stack formation.

DETAILED DESCRIPTION

Figure 1:
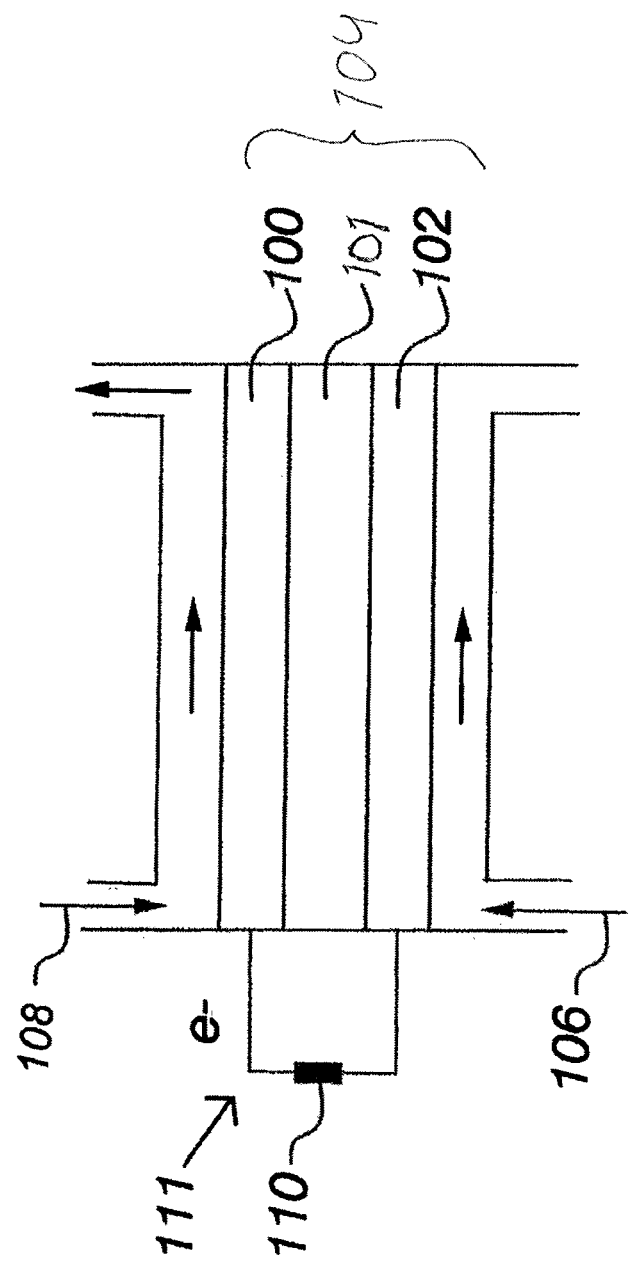
FIG. 1 presents a single fuel cell structure.

Exemplary embodiments disclosed herein can achieve an enhanced assembly of fuel cell stacks or electrolyzer cell stacks in order to minimize pressure losses and to make cell construction geometrically more economical. This is achieved by, for example, an assembly arrangement of solid oxide cells in a fuel cell system or in an electrolyzer cell system. The assembly arrangement includes the cells arranged with at least four angles and at least one cell stack formation, and at least one substantially plain attachment side of each at least four angled stack formation, the side having at least one geometrically deviating attachment surface structure in the otherwise substantially plain side between at least two corners of the at least four angled stack formation. The assembly arrangement can include a flow restriction structure for restricting air flows in the cell system to be mounted against the geometrically deviating attachment surface structure of each stack formation to attach at least one cell stack formation in the assembly arrangement, and an electrical insulation can be arranged to the attachment of the flow restriction structure and the stack formation.

An assembly method of solid oxide cells in a fuel cell system or in an electrolyzer cell system is also disclosed. In the method the cells are arranged with at least four angles and at least one cell stack formation, and air flows are restricted in the cell system by a flow restriction structure, which is mounted against a geometrically deviating attachment surface structure in a substantially plain side of each stack formation to attach at least one cell stack formation in the assembly arrangement, and the attachment of the flow restriction structure and the stack formation is insulated electrically.

Exemplary embodiments are based on accomplishing an assembly, in which at least one substantially plain attachment side of each at least four angled cell stack formation includes at least one geometrically deviating attachment surface structure in the otherwise substantially plain side between at least two corners of the at least four angled stack formation, and on a flow restriction structure for restricting air flows in the cell system to be mounted against the geometrically deviating attachment surface structure of each stack formation.

An exemplary benefit of the invention is that pressure losses can be minimized and stack footprint can be reduced compared to a solution in which air is manifolded internally in the stack as material is saved.

According to exemplary embodiments, a fuel cell or electrolyzer stack includes at least two single repetitious structures. A single repetitious structure can include at least one electrochemically active electrolyte element structure including anode electrode sides, an electrolyte in between, and a cathode electrode side, placed between at least two flow field plates for distributing reducing agent to the anode electrode side of the electrolyte element structure and for distributing oxidizing agent to the cathode electrode side of the electrolyte element, and at least one sealing means sealing the gas atmosphere at its intended enclosure.

The fuel and oxygen rich gas flow directions on the electrolyte element compared to each other can be arranged to so called co-flow arrangement where both gas flows have essentially the same direction, to so-called counter-flow arrangement where the gas flow directions differ from each other essentially by 180°, to so-called cross-flow arrangement where the gas flow directions differ from each other essentially by 90° or in a combination of two or three of these above mentioned flow arrangement structures.

In the following, exemplary embodiments are explained in relation to a solid oxide fuel cell technology. The solid oxide electrolyzer stack only differs from solid oxide fuel cell stack in that manner that electricity is used to produce fuel with reverse reactions to fuel cell reactions.

Figure 2:
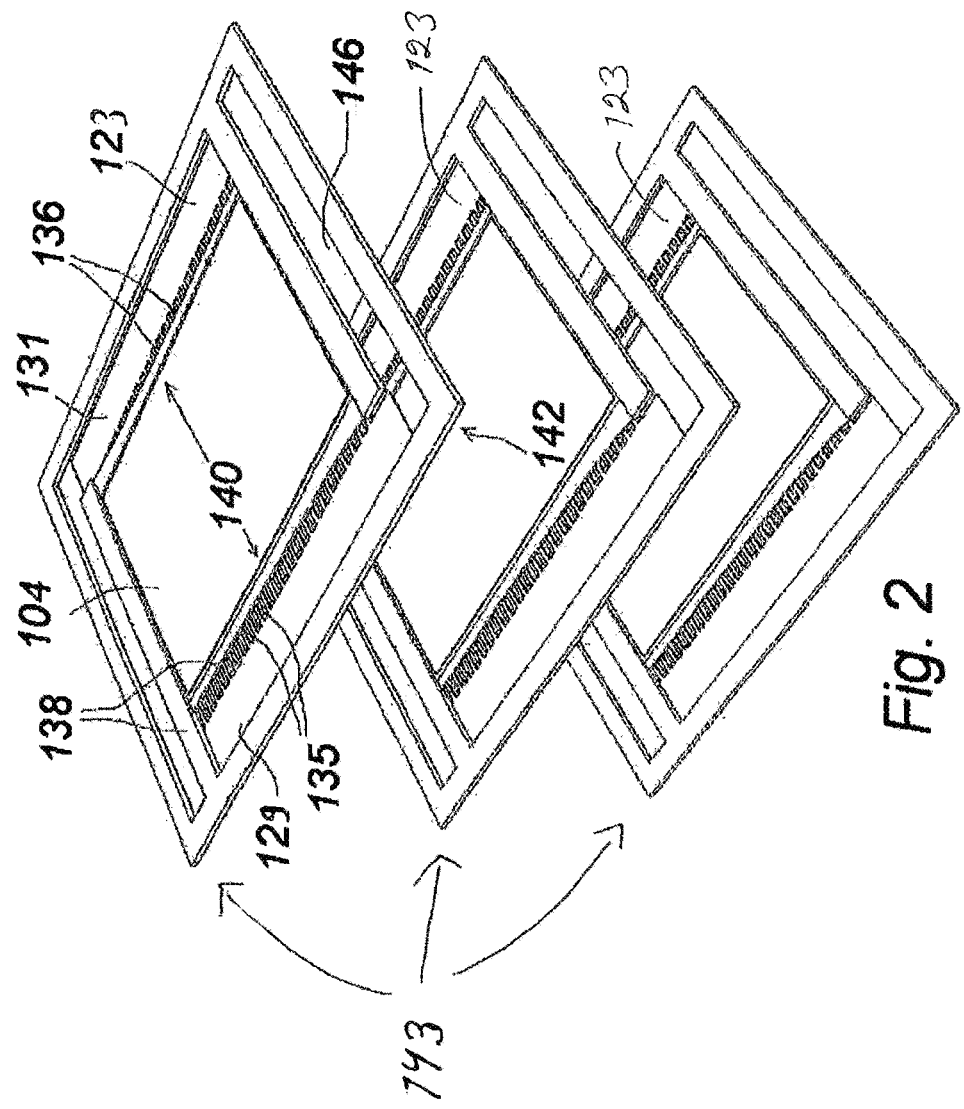
FIG. 2 presents an arrangement of flow field plates for a fuel cell stack.

FIG. 2 shows flow field plates 123 of a fuel cell stack. A complete fuel cell stack can include several plates 123 placed on successively each other in a shown manner. The plates in this embodiment are rectangular and symmetrical. An electrolyte element structure 104 having an electrolyte layer between an anode electrode and a cathode electrode is placed between the plates 123 generally in the middle of the plate. The electrolyte element structure 104 may be any suitable electrolyte element structure and is not therefore described herein in any further detail. The flow field plates 123 and the electrolyte element structure 104 are sealed with a gasket structure 138, which is for example made of compressible material, which is e.g. ceramic material. The gasket structures 138 according to the present disclosure are compressed when the cells are assembled to a stack formation. Two opposing flow field plates 123 and the electrolyte element structure 104 and the gasket structure 138 therebetween form a single repetitious structure 142.

The fuel cell stack arrangement of FIG. 2 can comprise flow restriction orifices 135, 136 opened to the flow distribution area 129 and to the flow outlet area 131. Means 143 can be used for guiding fuel feed flow to the flow distribution area 129 from sides 146 of the fuel cell. The gasket structure 138 is compressed over the flow restriction orifices 135, 136. The flow restriction orifices 135, 136 ensures homogenous fuel flow distribution to the entire active area of the fuel cell electrode by creating an additional pressure sink to the flow path. Reference numeral 140 describes the length of the flow path. The gasket structure 138 also creates similar pressure loss conditions between repetitious structures of the fuel cell ensuring homogenous flow distribution characteristics for each repetitious structure of a fuel cell. The even flow distribution in the fuel cell stack ensures also even thermal distribution conditions for the fuel cell stack, i.e. similar thermal gradients between the cells in the stack. Thus the duty ratio of the fuel cell stack can be improved, and lifetime of the fuel cell stack can be made longer.

A purpose of the gasket structure 138 is further to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plate planes 123. A flow field plate 123 is a planar thin plate that is made of metal alloy, ceramic material, cermet material or other material that can withstand chemical, thermal and mechanical stresses that are present in a fuel cell. The oxygen rich gas can be any gas or gas mixture, which includes a measurable amount of oxygen.

Exemplary manufacturing methods for forming the contoured surface of the flow field plates 123 are methods using plastic deformation such as stamping, pressing and like, wherein the shape of the material is changed but no material is added or removed, or methods wherein material is added such as welding or removed such as etching. Other manufacturing methods can be utilized if the flow field material is brittle such as extrusion, casting, printing, molding, and like. The orifices for gases can be for example made in a same manufacturing step.

Each flow field plate 123 can be made similar in the stack assembly structure, thus only one type of plate is needed to produce a fuel cell stack having desired amount of repetitious electrolyte element structures 104. This simplifies the structure and eases manufacturing of the fuel cells.

The single largest energy consumption device in a fuel cell system is the air blower or compressor that is used to supply air to the cathode compartment of fuel cell stack. The power consumption of the air supply devices is proportional to the pressure level they have to compress the air. Also in solid oxide electrolyzer system, air can be supplied to the anode in order to control the heat balance of the electrolyzer stack and to sustain well defined oxygen partial pressure on the anode compartment. One of the main pressure loss sources in the fuel cell and electrolyzer system is the stack itself. It can be advantageous to design the device in such a manner that the air side of the device has open channels to the surrounding atmospheres. In this configuration, the air supply and exhaust chambers can be designed individually from the stack device in such a manner that the pressure losses are minimized. Such a design also allows cost reductions to the system as the stack footprint can be reduced compared to a solution in which air is manifolded internally in the stack as material is saved. Furthermore, the fuel distribution channels in sides 146 of the fuel cell are for example, placed 90° in respect to the air inlet and outlet sides in order to ensure even air flow distribution to the fuel cell stack as the fuel distribution channels are then not restricting the air flow to the stack. In exemplary embodiments according to the present disclosure, fuel distribution channels can also locate differently as presented above.

The present embodiments can be based on stack design feature in which the stack edge has at least one geometrical structure in which the flow restriction structure is mounted. The flow restriction structure can be loose enough to allow the stack to freely expand and shrink with temperature. On the other hand air cannot ever freely bypass the flow restriction structure 124 as it is placed inside a hollow structure 122 (FIG. 3) or it has a hollow structure attached to an extruding surface 122 (FIG. 8) of a stack edge. An electrical insulation is arranged to the attachment of the flow restriction structure and the stack.

Figure 3:
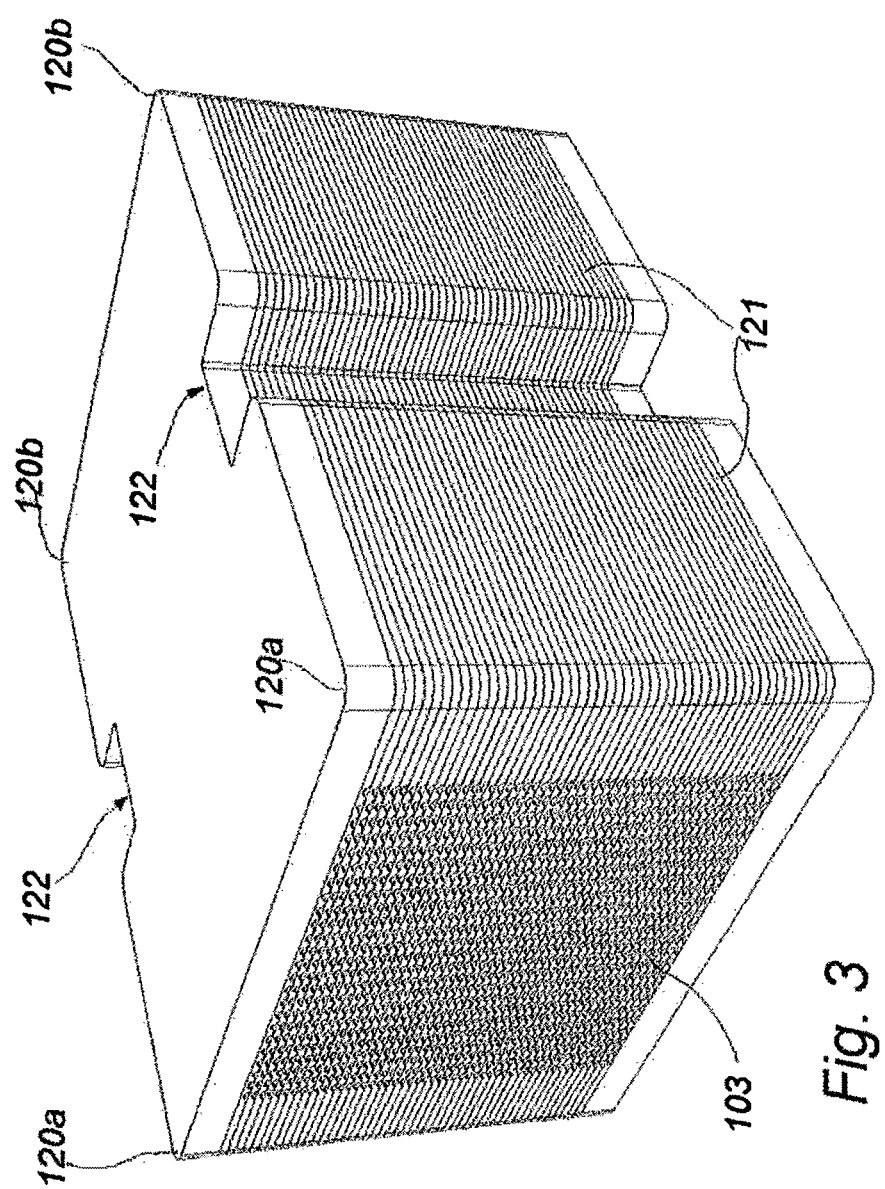
FIG. 3 presents an exemplary cell stack formation according to the present disclosure.
Figure 4:
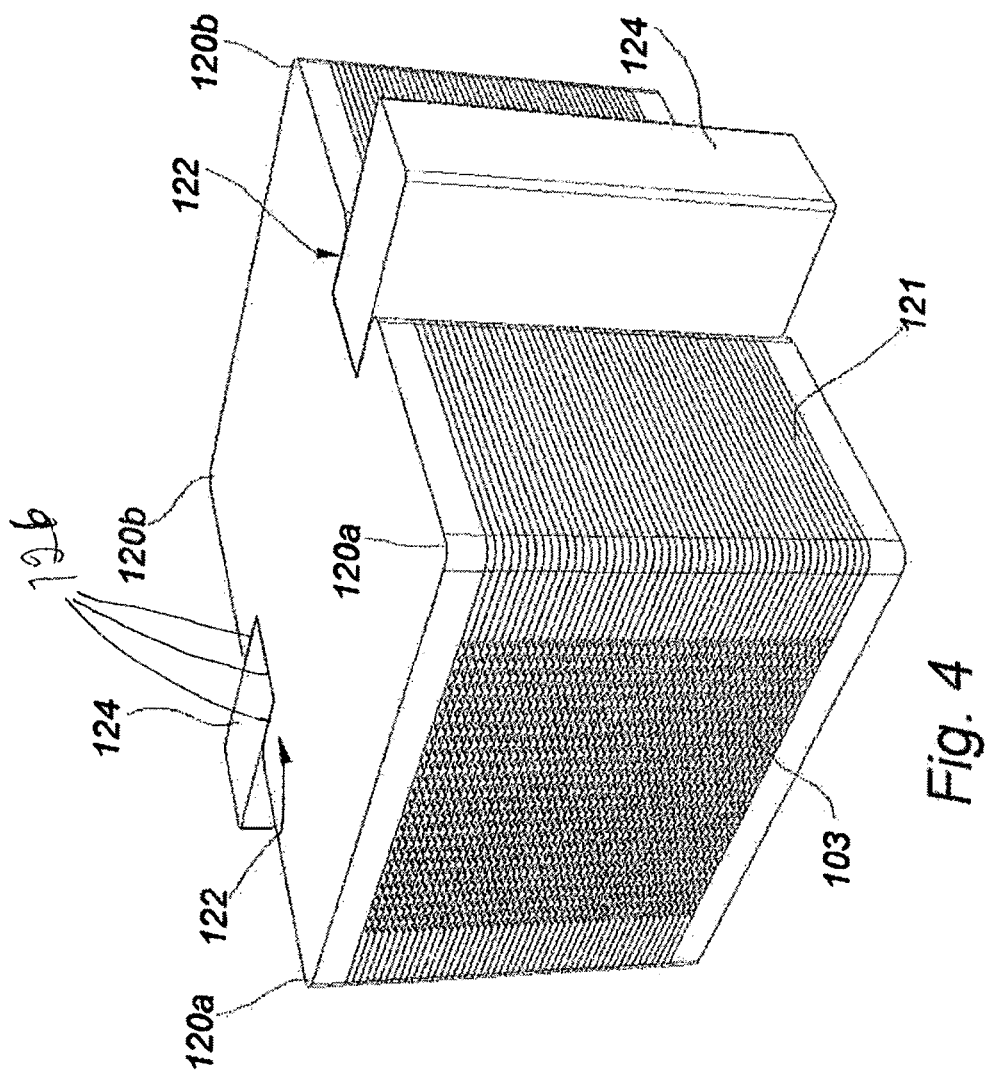
FIG. 4 presents an exemplary cell stack formation and a flow restriction structure according to the present disclosure.

In FIG. 3 is presented an exemplary cell stack formation 103 according to the present disclosure. The cell stack formation can be utilized for example in an assembly arrangement of solid oxide cells in a fuel cell system or in an electrolyzer cell system. An assembly arrangement according to the present disclosure can include the cells arranged for example to four angled 120a,b cell stack formation 103, and at least one substantially plain attachment side 121 in the four angled stack formation 103. The side can include at least one geometrically deviating attachment surface structure 122 in the otherwise substantially plain side 121 between at least two corners 120a, 120b of the four angled stack formation 103. In the example of FIG. 3 the geometrically deviating attachment surface structure 122 is intruding into the substantially plain attachment sides 121 of the stack formation 103. In FIG. 4 is presented a cell stack formation 103 of FIG. 3 and an exemplary flow restriction structure 124 according to the present disclosure for restricting air flows in the cell system to be mounted against the intruding attachment surface structure 122 of the cell stack formation 103. For example, at least surface 126 of the flow restriction structure 124 is electrically insulating. The electrical insulation can also be arranged otherwise, such as e.g. by a separate insulation between the flow restriction structure 124 and the stack formation 103 and/or by an insulation on the surface of the stack formation.

In the examples of FIGS. 3 and 4 the intruding attachment surface 122 in the stack formation 103 locates for example, substantially in the middle between at least two corners 120a, 120b of the four angled stack formation, and the intruding attachment surface 122 includes substantially rectangular shapes. Thus also the flow restriction structure 124 includes substantially rectangular shapes in the examples of FIGS. 3 and 4.

Figure 5:
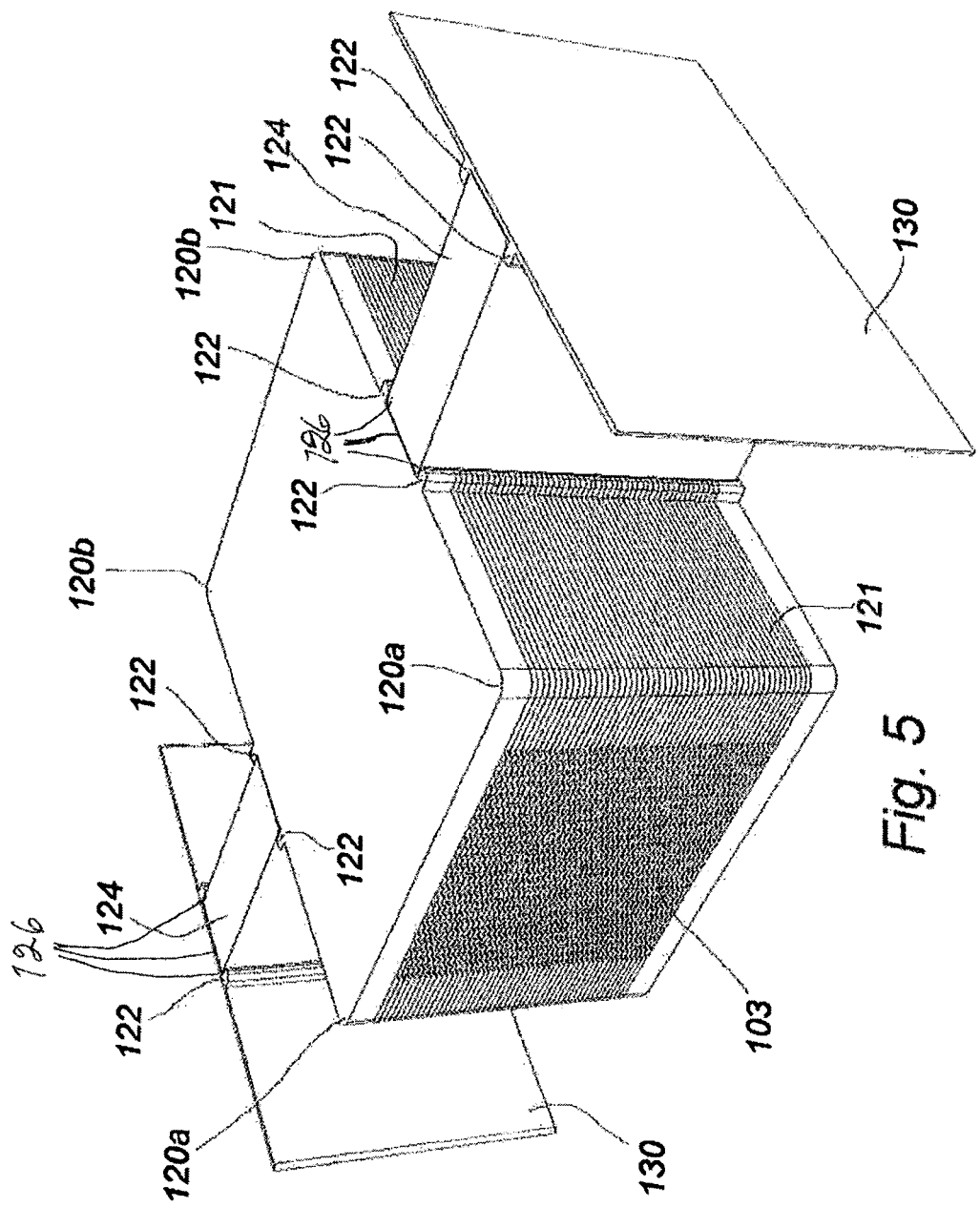
FIG. 5 presents an exemplary assembly arrangement of one cell stack.

In FIG. 5 is presented an exemplary assembly arrangement of one cell stack formation 103, in which the geometrically deviating attachment surface structures 122 are extruding from the substantially plain attachment sides 121 of the stack formation 103. Flow restriction structures 124 for restricting air flows in the cell system are mounted between the extruding attachment surface structures 122 of the stack formation, and the other end of the flow restriction structures 124 are attached between the extruding attachment surface structures 122 of side structures 130 in the assembly arrangement of FIG. 5.

Figure 6:
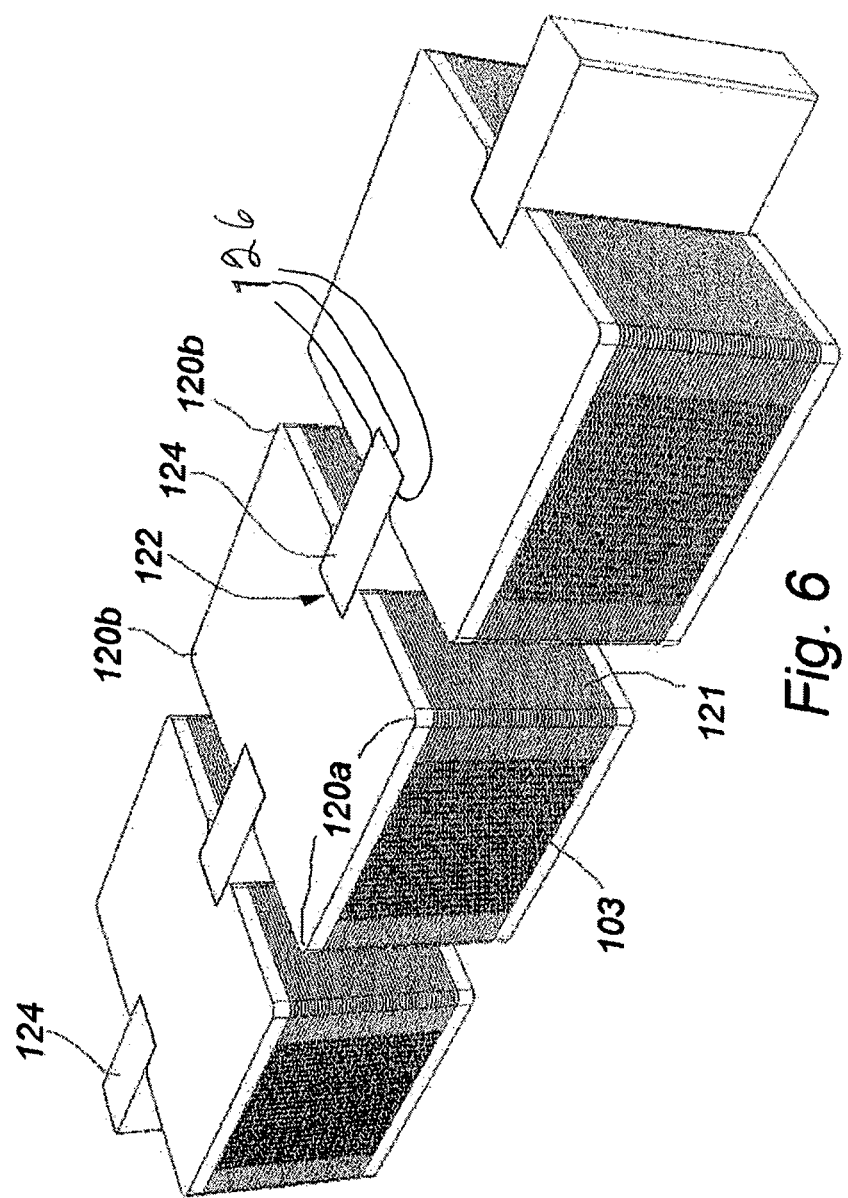
FIG. 6 presents an exemplary assembly arrangement of several cell stacks.

FIG. 6 presents an exemplary assembly arrangement of several cell stack formations 103, which include geometrically deviating attachment surface structures 122 in two opposite sides 121 of each cell stack formation 103. Flow restriction structures 124 for restricting air flows in the cell system are mounted against the intruding attachment surface structures 122 to attach each cell stack formation 103 to another cell stack formation. For example, the end located cell stack formations 103 (not shown) are attached to the side structure 130 (FIG. 5) in the assembly arrangement by intruding or extruding attachment structures of the side structure.

Figure 7:
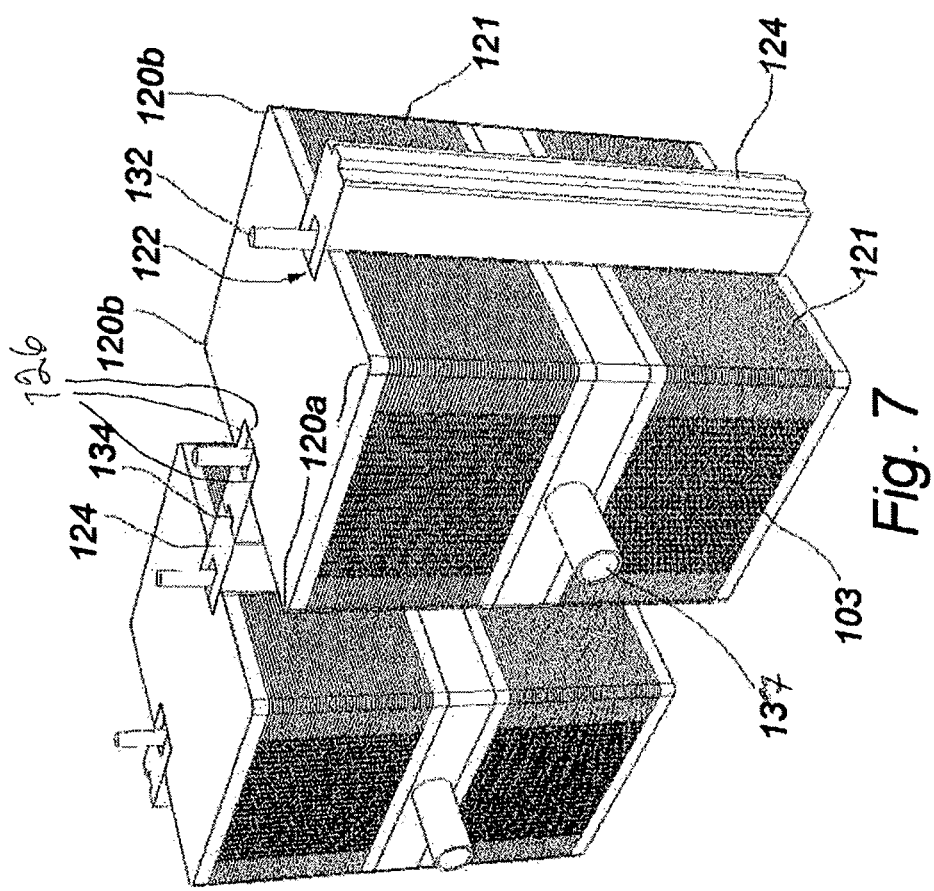
FIG. 7 presents an exemplary embodiment according to the present disclosure.

FIG. 7 presents one exemplary embodiment according to the present disclosure, in which embodiment the flow restriction structure 124 includes at least one lead-in for a pressing force rod 132. The flow restriction structures 124 includes attachment structures 134 to attach parts of the restriction structures 124 to form the entire flow restriction structure 124 between the stack formations 103. In other words the flow restriction structure 124 can be at least in two parts in the embodiments according to the present disclosure.

Figure 8:
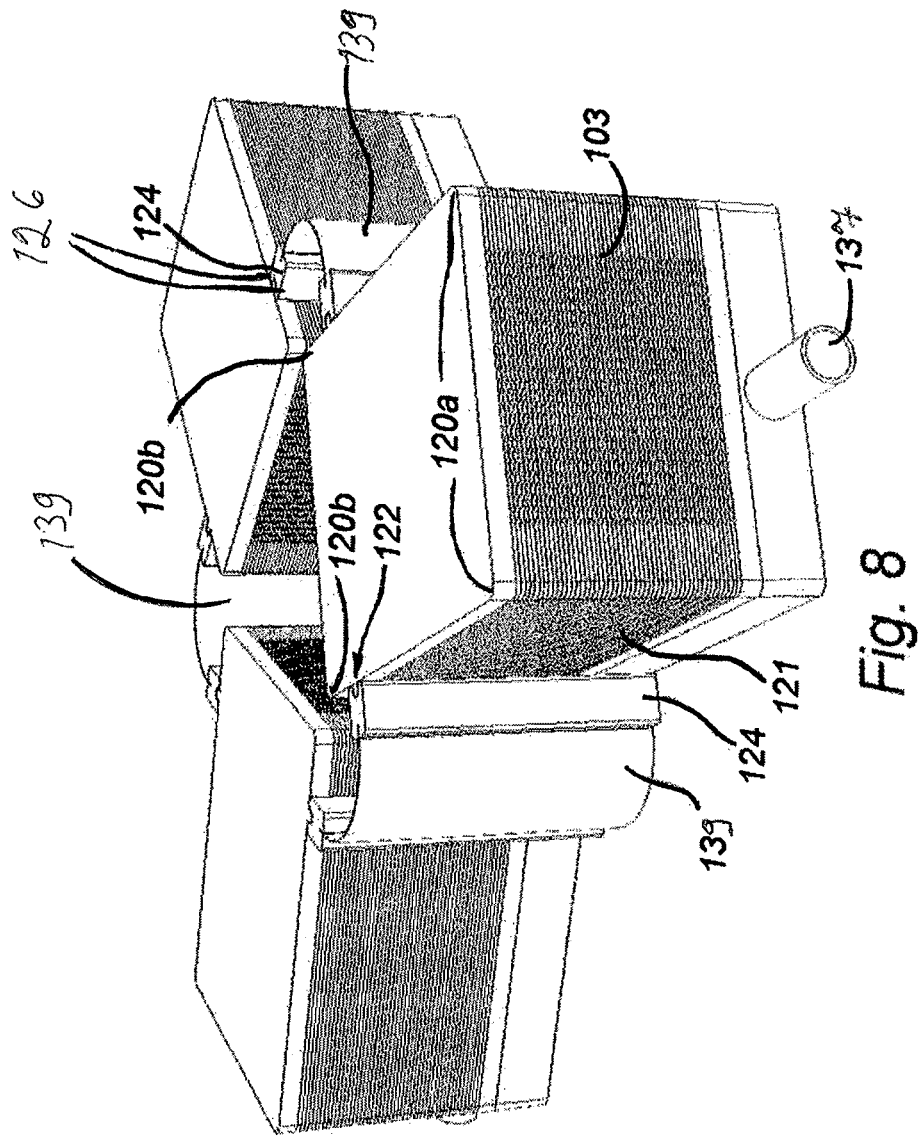
FIG. 8 presents another exemplary embodiment according to the present disclosure.

FIG. 8 presents another exemplary embodiment according to the present disclosure, in which embodiment the assembly arrangement is arranged to assemble at least three cell stack formations 103, which have at least one geometrically extruding attachment surface structure 122 in two opposite sides of each cell stack formation 103. Flow restriction structures 124 and 139 for restricting air flows in the cell system are mounted between the extruding attachment surface structures 122 to attach each cell stack formation 103 to another cell stack formation in order to form a circular assembly arrangement. The flow restriction structure parts 124 attached to the surface structure 122 can be at least in two parts utilizing for example an attachment plate 139 as a part of the flow restriction structure as shown in FIG. 8.

In the exemplary FIGS. 7 and 8 is also presented a fuel pipe 137 for feed-in or exhaust depending on the embodiment.

Thus, while there have been shown and described and pointed out fundamental novel features of the invention as applied to exemplary embodiments thereof, it will be understood that various omissions and substitutions and changes in the form and details of the invention may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An assembly arrangement of solid oxide cells for a fuel cell system or for an electrolyzer cell system, the assembly arrangement comprising:
    a plurality of cell stack formations, each cell stack formation having four sides;

a plain attachment side formed as at least one of the four sides of each cell stack formation, said plain attachment side is defined by a horizontal plane, wherein the plain attachment side includes at least one geometrically deviating attachment surface structure, the at least one geometrically deviating attachment surface structure having a length that fully extends across the plain attachment side in one direction of the horizontal plane;

at least one flow restriction structure configured for restricting air flows in a cell system, wherein the at least one flow restriction structure includes a first flow restriction structure that connects adjacent first and second cell stack formations of the plurality of cell stack formations, wherein the first flow restriction structure is mounted to a first geometrically deviating attachment surface structure of the first cell stack formation and is mounted to a first geometrically deviating attachment surface structure of the second cell stack formation, wherein the at least one flow restriction structure includes a second flow restriction structure that connects at least one of the first and second cell stack formations to an adjacent third cell stack formation of the plurality of cell stack formations, wherein the second flow restriction structure includes a first member mounted to a second geometrically deviating attachment surface structure of the at least one first and second cell stack formation and a second member that is attached to a third flow restriction structure of the third cell stack formation; and an electrical insulation to insulate each flow restriction structure and the cell stack formation.

2. The assembly arrangement according to claim 1, wherein the assembly arrangement is arranged to assemble at least the first, second, and third cell stack formations in a circular assembly arrangement, wherein the first flow restriction structure includes first and second members for connecting the first cell stack formation to the second cell stack formation.

3. The assembly arrangement according to claim 2, wherein the second member of the at least one flow restriction structure includes a plate between the first members attached to the geometrically deviating attachment surface structures, wherein the circular assembly arrangement of the plurality of cell stack formations is formed based on a curvature of the plate between a pair of first members.

4. The assembly arrangement according to claim 1, wherein the at least one flow restriction structure is configured to allow the stack formation to freely expand and shrink with temperature, by being mounted loosely against the at least one geometrically deviating attachment surface structure of each stack formation.

5. The assembly arrangement according to claim 1, wherein a length of each of the at least one first and second members is substantially equal to a height of each of the plurality of cell stack formations.

6. The assembly arrangement according to claim 1, wherein the first member of the second flow restriction structure is mounted to the second geometrically deviating attachment surface structure of the at least one first and second cell stack formation and the second member is attached to a pair of first members and joins the at least one first and second cell stack formations to the second flow restriction structure of the third cell stack formation.

7. A method for assembling solid oxide cells for a fuel cell system or for an electrolyzer cell system, the method comprising:

arranging a plurality of cell stack formations, each cell stack formation having four sides and is formed of a plurality of cells;

providing at least one geometrically deviating attachment surface structure on at least one plain attachment side to compensate mechanical stresses due to thermal expansions of materials, the at least one geometrically deviating attachment surface structure fully extending across the plain attachment side in a second direction of a horizontal plane;

mounting at least one flow restriction structure for restricting air flows in the cell system, the at least one flow restriction structure includes a first flow restriction structure that connects adjacent first and second cell stack formations of the plurality of cell stack formations, wherein the first flow restriction structure is mounted to a first geometrically deviating attachment surface structure of the first cell stack formation and is mounted to a first geometrically deviating attachment surface structure of the second cell stack formation, wherein the at least one flow restriction structure includes a second flow restriction structure that connects at least one of the first and second cell stack formations to an adjacent third cell stack formation of the plurality of cell stack formations;

mounting a first member of the second restriction structure to a second geometrically deviating attachment surface structure of the at least one first and second cell stack formations;

attaching a second member of the second flow restriction structure to a third flow restriction structure of the third cell stack formation; and electrically insulating the attachment of the flow restriction structure and the stack formation.

8. The method according to claim 7, wherein the first flow restriction structure includes first and second members for connecting the first cell stack formation to the second cell stack formation, the method comprising:

assembling the first, second, and third cell stack formations in a circular assembly arrangement.

9. The method according to claim 8, wherein connecting the second member of the at least one flow restriction structure comprises:

connecting a plate between the first members attached to the geometrically deviating attachment surface structures, wherein the circular assembly is formed based on a curvature of the plate between the pair of first members.

10. The method according to claim 7, wherein the flow restriction structure is configured to allow the stack formation to freely expand and shrink with temperature, by being mounted loosely against the at least one geometrically deviating attachment surface structure in the plain attachment side of each stack formation.

11. The method according to claim 7, wherein the at least one flow restriction structure is arranged such that a length of each of the at least one first and second members is substantially equal to a height of each of the plurality of cell stack formations.

* * * * *